United States Patent Office 3,260,490
Patented July 12, 1966

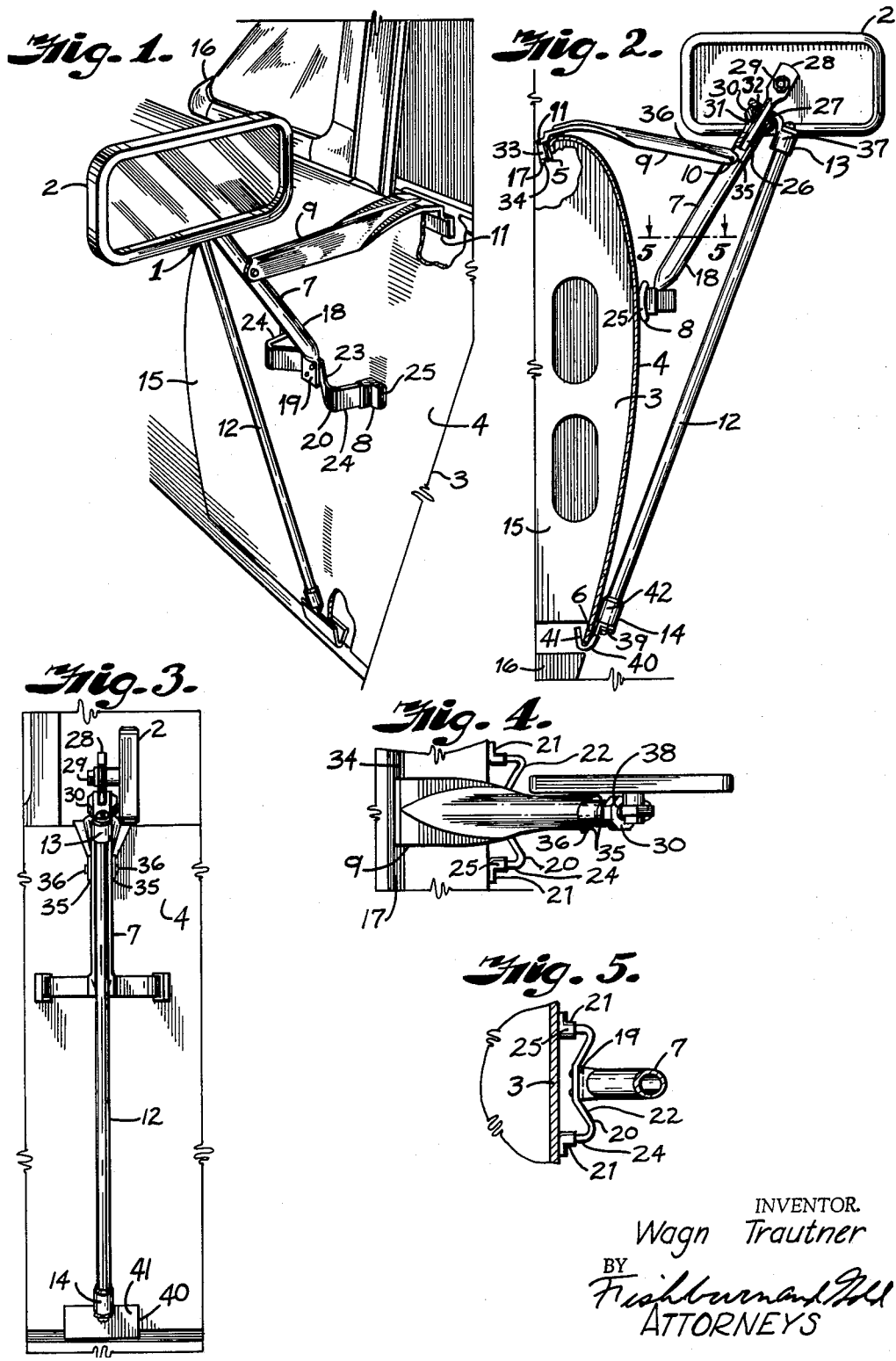

3,260,490
ARTICLE MOUNT
Wagn Trautner, Overland Park, Kans., assignor to Peterson Manufacturing Company, Kansas City, Mo., a corporation of Missouri
Filed Aug. 17, 1964, Ser. No. 390,089
12 Claims. (Cl. 248—226)

This invention relates to a novel construction of an article mount, and more particularly to a mounting structure for supporting an article from a wall member, as for example the supporting of a rear vision mirror in outwardly disposed relation of a vehicle door or like member.

The present invention contemplates the temporary mounting of rear vision mirrors and the like on vehicles, and particularly a structure that can be easily and quickly applied to a vehicle door or the like for needed rear vision as when towing boats, utility trailers and the like. The invention further contemplates a mounting structure wherein an article is carried on one end of an arm with the other arm end for engaging a surface between spaced opposed edges with a suspending member connected to the arm and hooked over one edge and an elongatable member connecting said arm outwardly of the connection of the suspending member therewith and the other edge to apply a force to maintain the mount in position until the elongatable member is released.

The principal objects of the present invention are to provide an article mount adapted to be mounted on a wall structure having spaced opposed edges wherein two rigid members are pivotally connected with ends spaced and engaging said wall, one member engaging an edge and the other member adapted to have an article supported thereby and a member connecting said other member outwardly of the pivotal connection and the other edge of the wall to maintain the engagement of said ends with the wall; to provide an article mount wherein the article is a rear view mirror and the wall is a vehicle door; to provide such a structure adapted for temporary mounting on vehicles wherein the article is mounted at one end of a rigid arm which has laterally spaced bumpers at the other end for engaging a vehicle door surface and a rigid suspension member pivotally connected to said arm adjacent said one end with the other end thereof adapted to be hooked over the window sill and an elongatable resilient member connecting the arm adjacent said one end thereof to the lower edge of the door in response to elongation of said resilient member to apply a downward force on the outer end of the arm and thereby retain same in position on the vehicle door; to provide a cushioned hook on said elongatable member to engage said lower edge of the door; and to provide an article mount that is of simplified construction, easily applied to a wall such as a vehicle door with the article such as a rear vision mirror in outwardly spaced relation therefrom and which will be held in place by tension on the elongatable elastic member to prevent displacement in the ordinary use to which it is subjected.

Other objects and advantages of this invention will become apparent from the following description taken in connection with the accompanying drawings wherein are set forth by way of illustration and example certain embodiments of this invention.

FIG. 1 is a partial perspective view of a vehicle at the lefthand front door with an article mount in the form of a rear vision mirror support thereon, portions being broken away to illustrate the connection of parts of the vehicle door.

FIG. 2 is a sectional view through the lefthand front door of a vehicle and elevation of the article support mounted thereon, portions of the arm being broken away to show the extensible structure.

FIG. 3 is a partial side elevational view of a vehicle with the article mount thereon.

FIG. 4 is a partial plan view of the vehicle door with the article mount positioned thereon.

FIG. 5 is a horizontal sectional view through the mounting arm and door taken on the line 5—5, FIG. 2.

Referring more in detail to the drawings:

The reference numeral 1 generally designates an article mount or support wherein an article 2 is supported from a wall structure 3 in easily removable relation thereto. The structure contemplates a wall structure 3 having a wall surface 4 with members or edges forming opposed abutments 5 and 6, with one abutment 5 preferably above the other.

The article 2 is carried on one end of an arm 7 having the other end portion 8 arranged to engage the surface 4 of a wall 3 with the article 2 outwardly therefrom. A rigid bracket or suspension member 9 has one end pivotally connected as at 10 to said arm 7 between the article 2 and the end portion 8 with the other end 11 of the bracket or suspension member 9 engaging the upper edge or abutment 5 whereby both the arm 7 and the suspension member 9 engage the wall in spaced relation and converge outwardly therefrom to the pivotal connection thereof. An elongatable resilient or elastic member 12 has one end 13 connected to the arm 7 adjacent the article 2 and the other end 14 after elongation engages the lower edge or abutment 6 to apply a downward force on the article end of the arm 7 whereby the engagement of the end portion 8 with the wall surface 4 forms a fulcrum and the arm 7 acts as a lever pulling the end 11 of the bracket 9 into tight engagement with the abutment 5 to retain the mount in position.

The article 2 may be of any form desired to be supported, and the wall 3 may have varied arrangements. In the illustrated structure, the article 2 is a rear view mirror supported outwardly of the surface 4 which is on a wall 3 of a door 15 of a vehicle 16. In the structure illustrated, the upper abutment 5 is the sill of window opening 17 of the door 15.

In the support structure illustrated, the arm 7 is of a telescoped extensible structure with one section 18 being a tubular member with its lower end portion provided with a flat depending ear 19 that is suitably secured to a foot member 20, midway between laterally spaced feet 21. The foot member 20 in the structure illustrated has a bar 22 that extends laterally and outwardly from the ear 19 and is then bent backwardly as at 23 to form spaced portions 24 that terminate in the feet 21 that are the arm end portion 8 and are preferably coated with a cushion material 25 to provide resilient bumpers to prevent marring of a surface engaged thereby. The other section of the arm 7 is a rod-like member 26 slidable in the tubular portion 18 and extending from the end 27 thereof remote from the ear 19. The outer end of the rod may be flattened as at 28 or otherwise shaped whereby the rear view mirror or article 2 may be secured thereto by a suitable fastening device 29 as by a screw and nut. With this arrangement, the outwardly extension and length of the arm 7 may be varied and the structure held in extended position by means of a sleeve nut 30 threaded on screw threads 31 of the end 27 of the tube 18. This nut 30 is a sleeve nut and has a tension ring 32 therein so that by threading the nut onto the tubular section 18 the tension ring 32 is tightened against the rod 26 to hold same relative to the tubular section 18. This also provides a rotatable connection whereby the mirror may be rotated about the axis of the arm to aid in adjusting the position of the mirror.

The bracket or suspension member 9 has an end portion 11 to engage the lower sill of the window opening 17 and a depending flange 33 that extends downwardly therefrom engaging the inner edge 34 of said sill. It is preferable that the end portion 11 be at an angle to the main length of the bracket, as illustrated in FIG. 2. The bracket is U-shaped in cross-section for rigidity in the portion extending from the end portion 11, terminating at the other end in spaced ears 35 that straddle the tubular portion 18 and pivotally mounted on trunnion or pin members 36. The length of the bracket and its angular relation is such that the outer portion inclines downwardly from the window sill when applied to the door and has an angular relation with the arm 7 of less than 90 degrees. The wide width of the end portion 11 and flange 33 cooperate with the wide spacing of the bumpers on the feet 21 to give lateral support.

Anchoring force is applied to the structure by means of the elongate elastic member 12 which at the one end 13 is connected to a fitting 37 that has an eye 38 sleeved on the rod 26 and adapted to engage the sleeve nut 30. At the other end 14 of the elastic member 12 there is a fitting 39 that has a hook 40 preferably covered with a cushioning material 41 and adapted to engage under the lower edge or abutment 6 of the door, as illustrated in FIG. 2. It is preferred that a cushion sleeve 42 be applied to the part of the fitting 39 surrounding the lower end of the elastic member so as to avoid marring of the outer surface of the door. The member 12 in relaxed position is substantially shorter than the length shown in FIG. 2 so that said elastic member must be extended and thereby be placed under tension when the structure is mounted on the door. This applies a downward force on the upper end portion of the tube 18 of the arm 7 or outwardly of the pivotal connection of the arm and bracket so that the arm becomes a lever fulcruming at the feet 21 and applying an outward force on the bracket or suspending member 9 to hold the structure in place on the door.

When it is desired to use a structure constructed as described, it is moved to the side of a door of a vehicle or other suitable wall, the bracket end portion 11 moved over the window sill 5 whereby the flange 33 extends downwardly between the glass and sill. The arm 7 is then hinged on the trunnions 36 to bring the bumpers on the feet 21 into engagement with the surface 4 of the door and then the elastic member 12 is stretched until the hook 40 is engaged under the lower edge 6 of the door. By loosening the nut 30, the arm 7 may be extended and the rod 26 rotated in the tube 18 to obtain a desired position of the mirror. The nut 30 is then tightened to hold it in selected position. If it is desired to use the mirror on the opposite side of the vehicle, the nut 30 may be loosened and the rod portion 26 moved outwardly and the mirror turned to reverse its direction and the nut 30 then retightened in the selected position of the rod. When it is desired to remove the structure, the elastic member 12 is stretched, releasing the hook 40 from the bottom edge of the door and then the bracket moved upwardly from the window sill lifting the entire structure from the door. This makes it possible to quickly and easily apply the rear view mirror to a vehicle with substantial outward spacing to facilitate operating the vehicle with a trailer or the like connected to the rear thereof and the easy removal after such use is ended.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. An article support adapted to be mounted on a wall comprising,
    (a) an elongate arm having one end for engaging a wall surface,
    (b) a bracket member having one end pivotally connected to said arm in spaced relation to said one end thereof and having the other end for connecting engagement with the wall in spaced relation to said one end of the arm,
    (c) means on the other end of said arm for mounting an article thereon,
    (d) and a tension member connected to said arm adjacent said other end thereof in spaced relation to the pivotal connection of the bracket member and having a portion for connecting engagement with the wall to apply a force on the arm away from said bracket to maintain the engagement of said other end of the bracket member with the wall.

2. An article support adapted to be mounted on a wall having spaced opposed abutments comprising,
    (a) an elongate arm having one end for engaging a wall surface between opposed abutments,
    (b) a bracket member having one end pivotally connected to said arm in spaced relation to said one end thereof,
    (c) means on the other end of said bracket member for engaging one of said spaced abutments when the one end of the arm is engaging the wall surface between said abutments,
    (d) means on the other end of said arm for mounting an article thereon,
    (e) and a tension member connected to said arm adjacent said other end thereof in spaced relation to the pivotal connection with the bracket member and having a portion for engaging the other abutment to apply a force on the arm toward said other abutment to pull the means on the bracket member into tight engagement with said one abutment.

3. An article support as set forth in claim 2 wherein said one end of the arm has laterally extending portions terminating in spaced bumper feet for engaging the wall.

4. An article support as set forth in claim 3 wherein the article is a rear vision mirror and the arm is extensible with means for securing the mirror and arm in selected position.

5. An article support adapted to be mounted on a wall having spaced opposed abutments comprising,
    (a) an elongate rigid arm having one end for engaging a wall surface between opposed abutments,
    (b) a rigid bracket member having one end pivotally connected to said arm in spaced relation to said one end thereof,
    (c) means on the other end of said bracket member for engaging one of said spaced abutments when the one end of the arm is engaging the wall surface between said abutments,
    (d) means on the other end of said arm for mounting an article thereon,
    (e) an elongate elastic member having one end connected to said arm adjacent said other end thereof in spaced relation to the pivotal connection of the bracket member,
    (f) and a hook member on the other end of said elastic member for engaging the other abutment in response to stretching of said elastic member to apply a force on the arm toward said other abutment and pull the means on the bracket member in tight engagement with said one abutment.

6. An article support adapted to be mounted on a vehicle door comprising,
    (a) an arm having bumpers at one end adapted to engage an outer surface of a vehicle door between the window sill and the lower edge of said door,
    (b) a suspension member having one end pivotally connected to said arm in spaced relation to said one end thereof,
    (c) a hook on said suspension member for engaging over the window sill of the vehicle door with the bumpers of the arm engaging said door in downwardly spaced relation to said sill,
    (d) means on the other end of the arm for mounting an article thereon, (e) and an elongate member having one end connected to said arm adjacent said other end and outwardly spaced from said pivotal connection with the suspension member, said elongate member extending from said arm and terminating in a hook for engaging under a lower edge of the vehicle door with said elongate member under tension and applying force to the arm to pull the hook on the suspension member into engagement with the window sill.

7. An article support as set forth in claim 6 wherein said one end of the arm has laterally extending portions terminating in widely spaced bumper feet for engaging a vehicle door and said feet and the elongate member have cushion portions on the areas contacting the vehicle door.

8. An article support as set forth in claim 7 wherein the article is a rear vision mirror and the arm is a tubular structure and the means for mounting the mirror include a rod-like portion sleeved into said tubular arm with means for securing the rod in selected position.

9. An article support adapted to be mounted on a vehicle door comprising,
  (a) an arm having laterally spaced bumpers at one end adapted to engage an outer surface of the vehicle door between the window sill and the lower edge of said door,
  (b) a suspension member having one end pivotally connected to said arm in spaced relation to said one end thereof,
  (c) a hook on said suspension member for engaging over the window sill of the vehicle door with the bumpers of the arm engaging said door in downwardly spaced relation to said sill, said suspension member and said arm forming an acute angle therebetween adjacent said pivotal connection,
  (d) means on the other end of the arm for mounting an article thereon,
  (e) and an elongate elastic member having one end connected to said arm adjacent said other end and outwardly spaced from said pivotal connection with the suspension member, said elongate elastic member extending from said arm and terminating in a hook for engaging under a lower edge of the vehicle door with said elastic member elongated under tension applying force to the arm that pulls the hook on the suspension member into engagement with the window sill.

10. An article support adapted to be mounted on a vehicle door comprising,
  (a) an arm having two telescoping sections with laterally spaced bumpers at one end of one section adapted to engage an outer surface of a vehicle door between the window sill and the lower edge of said door,
  (b) a rigid suspension member having one end pivotally connected to said one arm section in spaced relation to said one end thereof,
  (c) a wide hook on the other end of said suspension member for engaging over the window sill of the vehicle door with the bumpers of said one arm section engaging said door in downwardly spaced relation to said sill, said suspension member and said arm forming an acute angle therebetween adjacent said pivotal connection,
  (d) means on the other arm section remote from said one arm section for mounting an article thereon,
  (e) an elongate elastic member having one end connected to the other end of said one arm section and outwardly spaced from said pivotal connection with the suspension member, said elongate elastic member extending downwardly from said one arm section,
  (f) and a hook member secured to the other end of said elastic member for engaging under a lower edge of the vehicle door with said elastic member elongated under tension for applying a force to the arm and pull the hook on the suspension member into engagement with the window sill.

11. An article support as set forth in claim 10 wherein said one end of said one arm section has laterally extending legs terminating in widely spaced feet forming the bumpers for engaging a vehicle door and said feet and the elastic member have cushion portions on the areas contacting the vehicle door.

12. An article support as set forth in claim 11 wherein the article is a rear vision mirror and the said one arm section is a tubular structure and the other arm section is a rod-like member sleeved into said tubular arm section and there is means on said one arm section engaging the rod-like member for securing the rod-like member in selected position.

References Cited by the Examiner

UNITED STATES PATENTS

| 3,166,283 | 1/1965 | Farnsworth | 248—226 |
| 3,172,633 | 3/1965 | Allen | 248—226 |
| 3,186,672 | 6/1965 | Weder | 248—226 |

CLAUDE A. LE ROY, *Primary Examiner.*

K. J. WINGERT, *Assistant Examiner.*